United States Patent [19]
Schöffl

[11] Patent Number: 5,169,093
[45] Date of Patent: Dec. 8, 1992

[54] METHOD AND DEVICE FOR FASTER AUTOMATIC DEPLOYMENT OF A PARACHUTE

[75] Inventor: Rainer Schöffl, Odenthal, Fed. Rep. of Germany

[73] Assignee: Dynamit Nobel Aktiengesellschaft, Troisdorf, Fed. Rep. of Germany

[21] Appl. No.: 604,468

[22] Filed: Oct. 29, 1990

[30] Foreign Application Priority Data

Oct. 28, 1989 [DE] Fed. Rep. of Germany ....... 3936064

[51] Int. Cl.⁵ ............................................. B64D 17/52
[52] U.S. Cl. .................................. 244/149; 244/130; 244/147; 244/152; 102/387; 102/405
[58] Field of Search ............... 244/150, 149, 138 R, 244/147, 152; 102/387, 489, 337, 354, 405

[56] References Cited

U.S. PATENT DOCUMENTS

| | | | |
|---|---|---|---|
| 3,054,584 | 9/1962 | Andras | 102/387 |
| 3,087,697 | 4/1963 | Potts | 244/149 |
| 3,726,499 | 4/1973 | Stencel | 244/149 |
| 4,013,009 | 3/1977 | Claude et al. | 102/34.1 |
| 4,372,215 | 2/1983 | Crepin | 102/387 |
| 4,858,532 | 8/1989 | Persson et al. | 102/387 |
| 4,876,963 | 10/1989 | Deffayet | 102/387 |
| 4,878,433 | 11/1989 | Pirolli | 102/387 |

FOREIGN PATENT DOCUMENTS

| | | |
|---|---|---|
| 3421140 | 1/1986 | Fed. Rep. of Germany . |
| 3515497 | 10/1986 | Fed. Rep. of Germany . |
| 3911654 | 10/1986 | Fed. Rep. of Germany . |
| 3825786 | 2/1990 | Fed. Rep. of Germany . |
| 2137715 | 12/1972 | France . |
| 2260772 | 9/1975 | France . |

OTHER PUBLICATIONS

Wehrtchnik, Aug., 1988; pp. 74-79.

Primary Examiner—Joseph F. Peters, Jr.
Assistant Examiner—Christopher P. Ellis
Attorney, Agent, or Firm—Antonelli, Terry Stout & Kraus

[57] ABSTRACT

A parachute associated with an object unfolds faster in an airstream if the object is first accelerated in the direction of descent. This principle can be applied advantageously to a mine system combating military targets from the air because the time between starting from an ambush position in the terrain to the onset of searching movements in the air can be shortened.

14 Claims, 3 Drawing Sheets

METHOD AND DEVICE FOR FASTER AUTOMATIC DEPLOYMENT OF A PARACHUTE

BRIEF DESCRIPTION OF THE INVENTION

This invention is directed to a method for shortening the time of deployment of a parachute attached to an object in an airstream, to a device for braking the fall and for promoting soft landing of an object from a small height having a parachute which opens automatically at a sufficient sinking (falling) speed of the object, as well as to a mine system for combating military targets from the air, wherein an active member is transported from an ambush position in the terrain, upon receipt of corresponding activation signals, into the air with the aid of a rocket engine, the active member enters into a descending flight braked by a parachute, and devices for the autonomous combating of the military targets from the air become effective thereby.

With the aid of a parachute, it is possible to drop loads having a relatively low sinking speed (on the order of 5 meters/sec.). A parachute, after having been pulled out of a packing bag, is automatically deployed by airflow. A minimum flight velocity of the object to be decelerated is required for deployment; such velocity is on the order of 15 meters/sec. In the case that the object, e.g. the submunition of an antitank mine, is launched close-to-vertical upward until a certain altitude is reached in order to descend afterwards by means of a parachute, this object has first to fly to the vertex where the vertical velocity is zero and then to enter into a free-fall phase until its velocity is sufficiently high for successful deployment of the parachute. This free-fall period takes at least 1.5 seconds to reach the initial sinking speed conditions for parachute deployment. For tactical reasons it is desirable to reduce this time period and even to allow parachute deployment before reaching the vertex.

SUMMARY OF THE INVENTION

It is an object of this invention to provide a method and device for shortening the time required by a parachute for its deployment. This method and this device are to be usable especially with a mine system wherein a parachute-delayed sinking (falling) occurs with maximum speed after attainment of a vertex height.

According to the method, this object has been attained by additionally accelerating the object in the flight direction (in most cases identical to the dropping direction) for the automatic deployment of the parachute. The device is characterized in that the object is connected to a switchable propulsion mechanism for the acceleration of the object. In the mine system, the thrust direction of the rocket engine is reversed shortly before reaching a desired height, and the active member is additionally accelerated downwardly until attainment of a minimum sinking speed.

A saving in time during opening of the parachute is obtained according to the method and, respectively, the device. Specifically with the mine system, the time gained enters the range of seconds; advantageously, the mine need not be transported to the height previously necessary and can begin combating military targets faster after attainment of the vertex height.

BRIEF DESCRIPTION OF THE DRAWINGS

The invention is illustrated by way of example in the drawings and further described below. In the drawings.

DETAILED DESCRIPTION OF THE INVENTION

Figure 1:
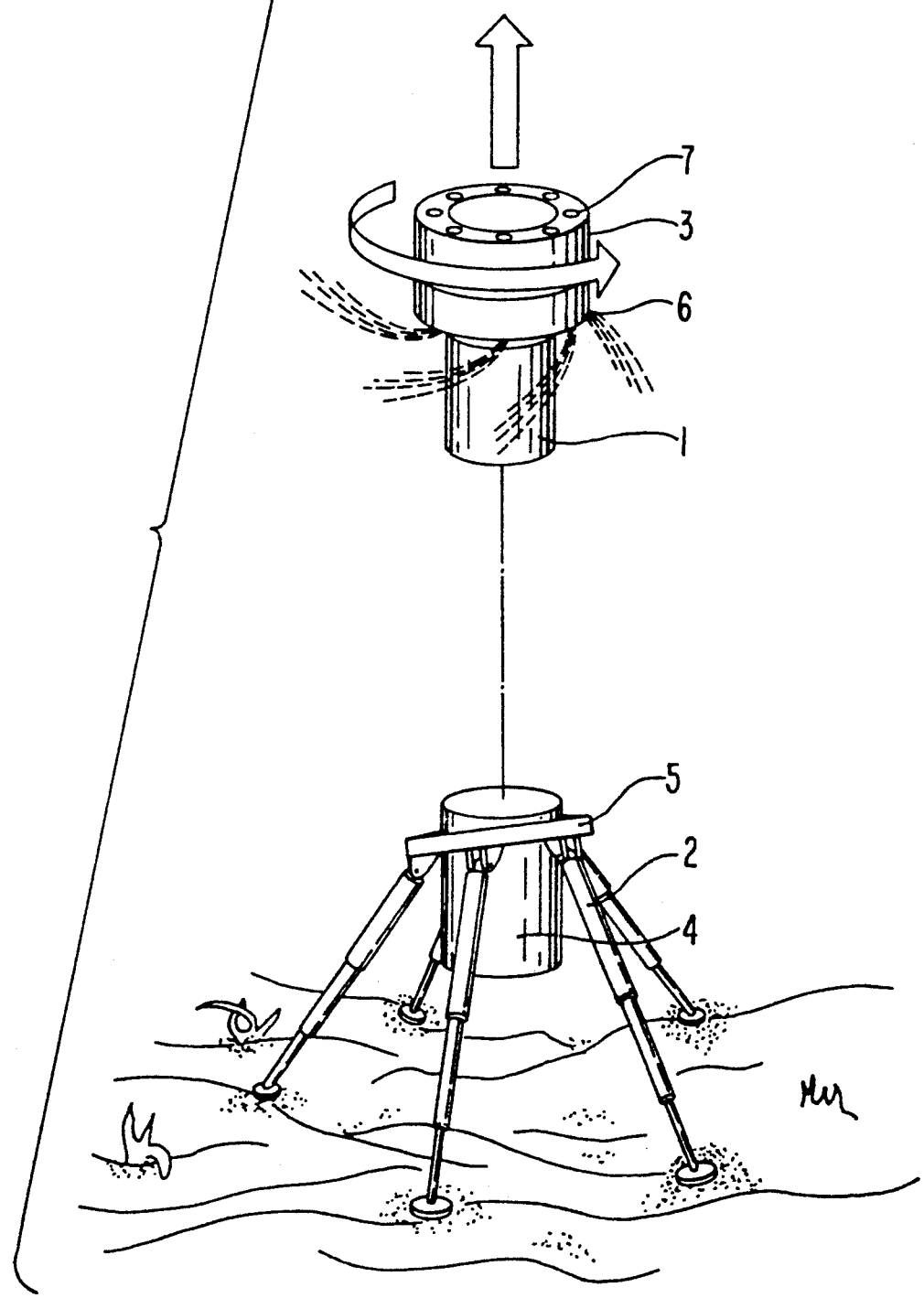
FIG. 1 shows the active member with rocket engine after launching.

FIG. 1 shows an ascending active member 1 of a modern mine system ("Wehrtechnik" [Military Technology] August/1988, pages 74–79). The active members is distributed in a cradle on the ground in ambush position. The member contains sensors (e.g. direction-finding microphones) and control means having an evaluating logic. As soon as a target transmitting specific signals has been detected within a preset regional area by the evaluating logic of the control means, the active member 1 is transported upwards by a rocket engine assembly 3 connected thereto. A special feature of the cradle 2 resides in the connection of the legs of the stand by way of a universal joint in a ring 5 with a sleeve 4 wherein the active member 1 is arranged. Thus, with a correspondingly low-positioned center of gravity, an always vertical alignment of the active member 1 with the rocket engine assembly 3 in the terrain is in all cases ensured, and no further steering maneuvers are required for the ascent. The active member 1 revolves about its longitudinal axis for stabilization; this is obtained by correspondingly obliquely located nozzles 6 in the rocket engine assembly 3.

Figure 2:
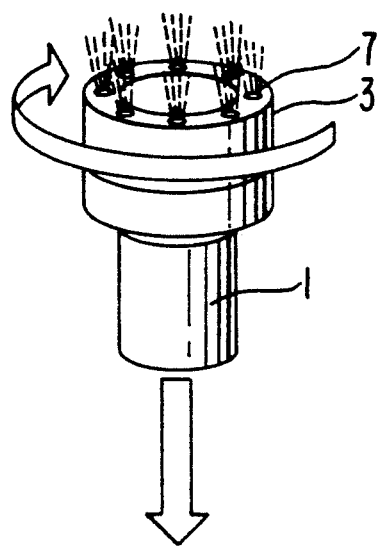
FIG. 2 shows the active member with reversed rocket engine after reaching the ceiling or vertex.

In accordance with a predetermined order of magnitude, the active member 1 is pulled upwards by the rocket engine assembly 3 to a height of 100–300 meters (the rocket engine assembly could also push the active member if it were mounted behind the active member). Upon reaching the predetermined ceiling or vertex, or also even a short time before this occurs, the thrust of the rocket engine assembly 3 is reversed. The gases thus exit through nozzles 7 in the upward direction (FIG. 2). Also, these nozzles 7 are somewhat obliquely oriented. These nozzles act to approximately cancel out the spin of the active member, which had been desirable during ascent for stabilization, in order not to impair the function of the parachute.

The parachute is accommodated in the upper region of the active member abutting against the rocket engine assembly 3. In this embodiment, deployment of the parachute takes place only when the rocket engine assembly 3 has been automatically severed from the active member after elapse of the thrust reversal phase. The time during which the thrust of the rocket engine assembly 3 is reversed is ordinarily below 1 second. By means of the reverse thrust, the active member can be accelerated in the downward direction within this time of, for example 0.2 sec., to a final velocity of 15 meters/sec. (meaning a sinking path of merely 1.5 meters).

Owing to this relatively brief time period within which the rocket engine accelerates the active member toward the ground, excessive tumbling or even somersaulting of the active member is prevented.

Figure 3:
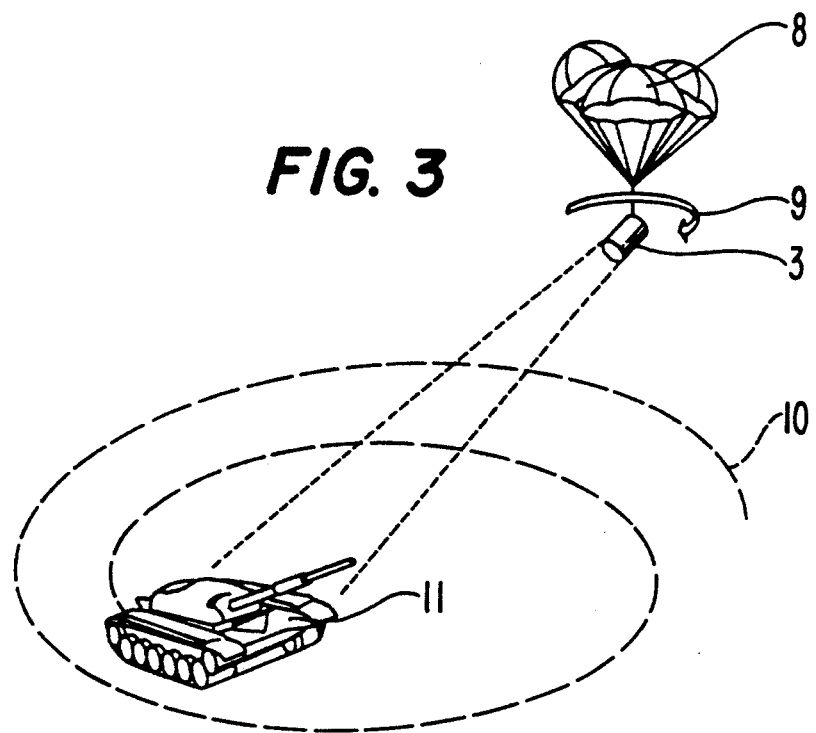
FIG. 3 shows the operating phase of the mine.

In FIG. 3, the active member 1 is suspended on a parachute 8, dropping therewith under moderate rotation 9. With its sensors, the active member sweeps a spiral-shaped route 10 on the ground, and as soon as a corresponding military target, e.g. a tank 11, has been detected, this target is combated, for example, by firing a hollow-charge projectile (not shown) from the active member.

Figure 4:
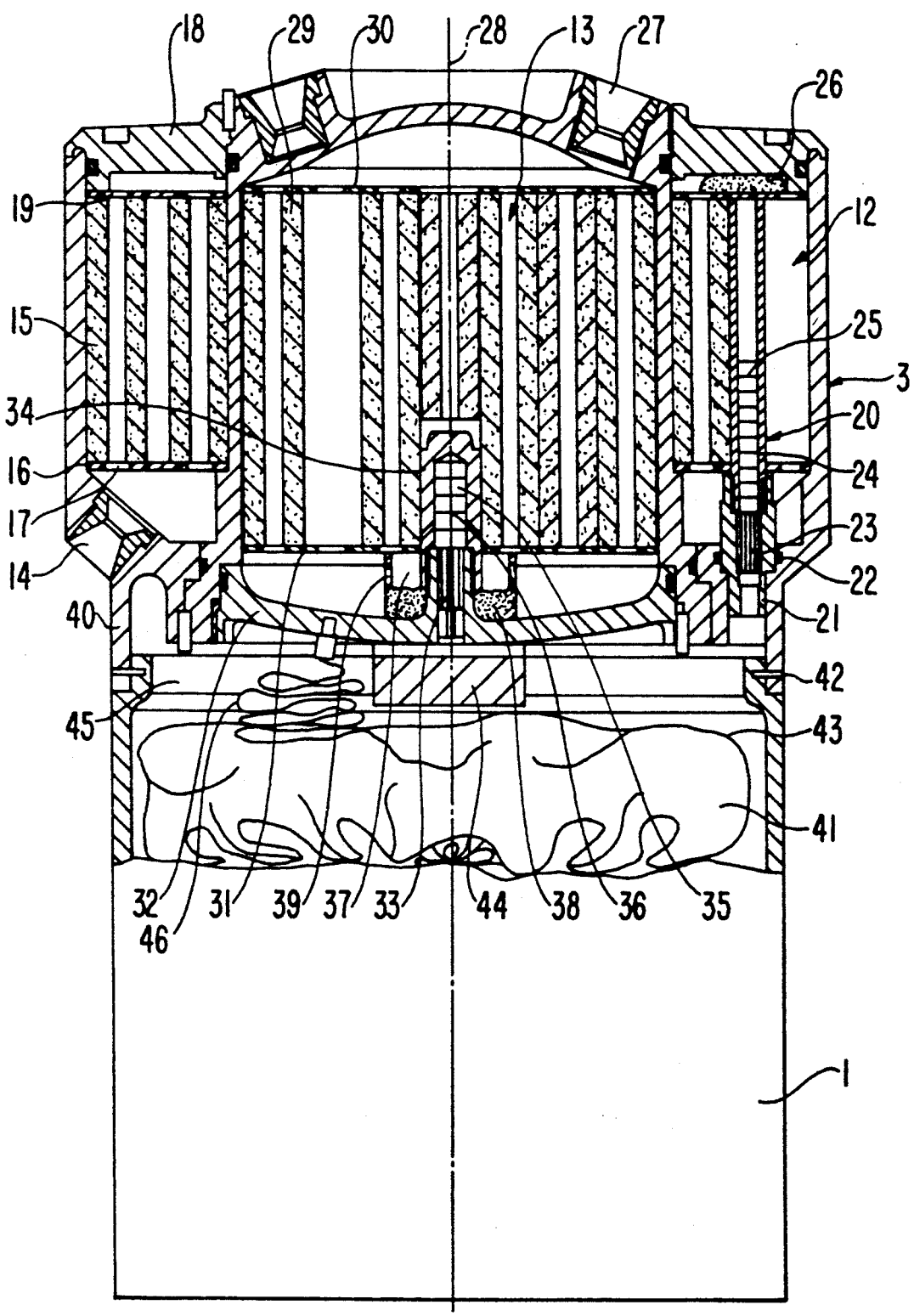
FIG. 4 is a sectional view of a rocket engine and associated members housing a parachute.

A rocket engine assembly suitable for performing the method for shortening the time of deployment of a parachute in the airstream is illustrated in FIG. 4. This engine assembly has been developed specifically for mines which are to combat military targets according to FIG. 3 from above. The thrust reversal of the rocket engine assembly 3 is here effected by two rocket engines 12, 13 inserted one in the other in concentric fashion. These engines are ignited in tandem. The annularly designed engine 12 has several nozzles 14 oriented obliquely downwardly/outwardly and simultaneously obliquely tangentially. Tubes of solid propellant 15 ar arranged in the engine 12; these tubes are supported on a ring 16 with apertures 17 and are covered with respect to the bottom 18 by a perforated plastic disk 19. The solid propellant 15 is ignited by two igniters 20 (the sectional view of FIG. 4 passes through only one igniter 20). An igniter 20 consists of a screw 21 with a sealing ring 22 and a primer cap 23, as well as a tube 24 with cylindrical elements 25 of an igniter mixture arranged in this tube. The charges 26 located thereabove and consisting of a plastic housing filled with a pulverulent initiator mixture serve for enhancing the flame produced by the combustion of the elements 25.

The nozzles 27 in the inner cylindrical engine 13 point upwardly. They are likewise oriented obliquely toward the outside and tangentially, namely in such a way that, upon cutoff of the engine 13, there is, if at all possible, no longer any inherent rotation of the engine about the axis 28. The engine 13 likewise includes tubes with solid propellant 29 resting on perforated disks 30, 31. A primer cap 33 is arranged centrally in the bottom 32. The housing 34, threadedly mounted thereabove, houses pressed components 35 of an initiator mixture. The flame produced during deflagration of the components 35 is conducted through bores 36 into a cup-shaped housing 37 wherein a powdery initiator mixture 38 is disposed. Upon ignition of the mixture 38, the combustion gases escape through radial apertures 39 and ignite the solid propellant 29.

The housings are sealed with respect to one another by O-rings, and the threadedly nestled parts are secured against spontaneous release by means of pins. The payload, here the active member 1, is attached to a shoulder 40 by means of pins. A parachute 41 is located in the upper zone of the active member 1 which is attached to the rocket engine 12 by shear pins 42. A pressure-generating pyrotechnical charge 44 which can be electrically ignited by a control unit within the active member 1 is disposed between the parachute 41, protected by a flameproof foil 43, and the bottom 32. Upon ignition, the pressure produced in the free space 45 causes the shear pins 42 to be severed, and the rocket engine assembly to be flung away in the upward direction. A connecting cord 46 between the bottom 32 and the parachute 41 acts to pull the parachute out rapidly, the parachute thus providing a braked drop of the active member.

The impulse exerted on the active member 1 upon ignition of the charge 44 is relatively small. However, this impulse additionally also enhances the downward acceleration of the active member 1, previously already initiated by the rocket engine assembly 3.

The rapid deployment of the parachute 41 is essentially brought about by the increased descent velocity; the connecting cord 46 at most enhances the deployment. The connecting cord 46 is detached from the parachute after being extended to its full length, so that the rocket assembly is allowed to separate from the active member 1.

The switching process for starting up the propulsion for upward acceleration is effected, for example, by a corresponding sensor depending on the launch altitude reached, the launching time, or the speed of the rising object at or near the vertex. Concretely, it can be seen in the embodiment shown in FIG. 4, that propulsion mechanism or engine 12 burns for a preset length of time and that engine 13 is ignited after likewise preset and fixed delay.

What is claimed is:

1. A method for shortening the time of deployment of a parachute attached to an object in an airstream, in which the object is transported upwards by means of a first drive in a transport phase and the parachute, after said transport phase is completed, brakes downward motion of the object, characterized in that the object is briefly accelerated downwardly by means of a second drive for more rapid deployment of the parachute when acceleration during the transport phase ends or shortly thereafter.

2. A method for shortening the time of deployment of a parachute attached to an object in an airstream, characterized in that the object is additionally accelerated downwardly in the flight direction for the spontaneous opening of the parachute and in that a second spin is transmitted to the object during the additionally downward acceleration of the object in order to offset a first spin produced during a rising phase of the object whereby impairment of the function of the parachute is avoided.

3. A device for braking the fall and for the soft landing of an object from a low height, comprising a parachute which opens automatically at an adequate flight velocity of the object, characterized in that the object is connected with a switchable propulsion means for imparting additional downward acceleration of the object, until the object reaches said adequate flight velocity, thereby effecting rapid deployment of said parachute.

4. A device according to claim 3, characterized in that the propulsion means includes a rocket engine assembly.

5. A device according to claim 4, characterized in that the assembly comprises two rocket engines, one nestled into the other, wherein one engine is accommodated in an approximately cylindrical housing while the other engine is accommodated in a housing annularly surrounding the first-mentioned housing, and the thrust directions of the two engines are directed in opposition to each other.

6. A device according to claim 3, characterized in that the propulsion means comprises a separable counter mass including a spent rocket engine, which can be pushed off opposite to the final flight direction of the object by means of a propellant charge.

7. A method for shortening the time of deployment of a parachute attached to an ascending object in an air stream, which comprises initiating an additional downward acceleration of the object at least before the object reaches a desired height; continuing the additional downward acceleration after the object has reached the desired height and begins to descend until the object attains a minimum sinking speed for effecting deployment of the parachute; and then releasing the parachute to be deployed.

8. A device for braking the fall and for providing a soft landing of an object descending from a low height, which comprises a parachute attached to said object, said parachute opening or deploying automatically at an adequate flight velocity in a downward direction; a propulsion means attached to the object for imparting additional downward acceleration of the object until the object reaches said adequate flight velocity in the downward direction and said parachute is deployed; and means for separating the propulsion means from said object upon attainment of said adequate flight velocity.

9. A device according to claim 8, wherein said propulsion means comprises a rocket engine assembly.

10. A device according to claim 8, wherein said object includes a zone in which the parachute is retained until separation of said propulsion means.

11. A device according to claim 8, further comprising a housing in which said propulsion means is located, said housing being connected to said object by detachable means which are actuated by a control unit within said object and a connecting cord attached to said housing and to said parachute so that upon separation of the housing from the object, the connecting cord acts to pull the parachute out from the object rapidly.

12. A device according to claim 9, wherein said rocket engine assembly comprises two rocket engines, one engine coaxially arranged within the other rocket engine, said one engine being accommodated in an approximately cylindrical housing and the other engine being accommodated in a housing annularly surrounding said cylindrical housing, the thrust direction of each of two of the said two engines being directed in opposition to the other.

13. A device according to claim 8, wherein said propulsion means comprises a separable rocket engine which can be separated from the object by means of a propellant charge in a direction opposite to the flight direction of the object taken at the end of said additional downward acceleration.

14. A method for shortening the time of deployment of a parachute attached to an ascending object in an air stream, which comprises initiating an additional downward acceleration of the object when the object reaches a desired height and zero velocity; continuing the additional downward acceleration after the object begins to descend until the object attains a minimum sinking speed for effecting deployment of the parachute; and then releasing the parachute to be deployed.

* * * * *